(12) United States Patent
DeRosa

(10) Patent No.: US 11,154,037 B2
(45) Date of Patent: Oct. 26, 2021

(54) COMBINATION ANIMAL HARNESS AND LEASH WITH METHOD

(71) Applicant: Alexander Joseph DeRosa, Bellmore, NY (US)

(72) Inventor: Alexander Joseph DeRosa, Bellmore, NY (US)

( * ) Notice: Subject to any disclaimer, the term of this patent is extended or adjusted under 35 U.S.C. 154(b) by 219 days.

(21) Appl. No.: 16/573,931

(22) Filed: Sep. 17, 2019

(65) Prior Publication Data
US 2021/0076641 A1    Mar. 18, 2021

(51) Int. Cl.
*A01K 27/00*    (2006.01)

(52) U.S. Cl.
CPC .......... *A01K 27/002* (2013.01); *A01K 27/003* (2013.01)

(58) Field of Classification Search
CPC ..... A01K 27/00; A01K 27/002; A01K 27/003
See application file for complete search history.

(56) References Cited

U.S. PATENT DOCUMENTS

| | | | |
|---|---|---|---|
| 4,483,275 A | 11/1984 | De Groot | |
| 5,743,216 A * | 4/1998 | Holt, Jr. | A01K 27/002 |
| | | | 119/793 |
| 6,401,666 B1 * | 6/2002 | Kircher | A01K 27/002 |
| | | | 119/792 |
| 6,619,238 B1 * | 9/2003 | Amato | A01K 27/003 |
| | | | 119/792 |
| 7,275,396 B2 * | 10/2007 | MacHock | A44C 7/009 |
| | | | 24/298 |
| 8,281,748 B2 * | 10/2012 | Elkins | A01K 13/001 |
| | | | 119/792 |
| 8,920,084 B2 * | 12/2014 | Dahl | D07B 1/18 |
| | | | 410/96 |
| 9,271,476 B1 * | 3/2016 | Flynn | A01K 27/002 |
| 9,301,505 B1 | 4/2016 | Luna | |
| 9,549,535 B1 | 1/2017 | Rice | |
| 2010/0294212 A1 | 11/2010 | Therrian | |
| 2011/0083616 A1 * | 4/2011 | Elkins | A01K 27/003 |
| | | | 119/792 |
| 2012/0180376 A1 * | 7/2012 | Nelson | A01K 93/00 |
| | | | 43/44.9 |
| 2013/0074782 A1 | 3/2013 | Marran | |
| 2014/0331944 A1 * | 11/2014 | Chirico | A01K 15/02 |
| | | | 119/797 |
| 2015/0189860 A1 | 7/2015 | Peterson | |
| 2016/0050887 A1 * | 2/2016 | Polcyn | A01K 27/003 |
| | | | 119/797 |
| 2017/0360025 A1 * | 12/2017 | Skryplonek | A01K 15/02 |

* cited by examiner

*Primary Examiner* — Kristen C Hayes
(74) *Attorney, Agent, or Firm* — Michael C. Balaguy

(57) ABSTRACT

An animal-harness includes a line, two crimps along the line, and a ring. The line is formed at one end. The two parallel lines formed by the bight are crimped together by both crimps. The two crimps are spaced apart, and the lines therebetween form a gap. Through this gap, the line may be passed through to form a loop. The line of the bight may pass through the ring. This ring is large enough for the long end of the line to pass through it as well, so that another loop may be formed. Thusly, in use, two loops or formed. One loop may be passed around an animal collar region, and another around an animal girth, to form a secure and safe harness around the animal. The remaining length of the line is available to be used as a leash.

6 Claims, 5 Drawing Sheets

COMBINATION ANIMAL HARNESS AND LEASH WITH METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of animal husbandry of existing art and more specifically relates to animal harnesses.

RELATED ART

Dog owners often use a harness and leash when walking a dog. A harness assists the owner in controlling the dog and reducing pulling on the neck region. Without one, the dog may jump, pull, and even escape their owner. However, locating a harness and leash and putting them on a dog before a walk can be a time-consuming task and makes it difficult to just get up and go. Further, many contemporary harnesses are complicated, expensive to produce, unattractive, and uncomfortable. A suitable solution is desired.

U.S. Pat. No. 9,301,505 to John Luna relates to an animal restraint device. The described animal restraint device restrains an animal and is adjustable to fit the animal as the animal grows. The device includes a flexible strap having a first end, a second end and a medial portion coupled to and extending between the first end and the second end. The medial portion is configured to extend around a neck of an animal to form a first loop around the animal's neck. The medial portion is configured to extend around a midsection and a back of the animal to form a second loop around the animal's back and midsection. A first connector is coupled to the medial portion. A second connector is coupled to the second end. The first connector is removably couplable to the second connector for securing the strap in a restrained position around a body of an animal.

SUMMARY OF THE INVENTION

In view of the foregoing disadvantages inherent in the known animal harness art, the present disclosure provides a novel combination animal harness and leash with method. The general purpose of the present disclosure, which will be described subsequently in greater detail, is to provide a combination animal harness and leash with method.

An animal-harness is disclosed herein. The animal-harness includes a line, two crimps along the line, and a rigid ring. The line is formed at one end into a bight by turning the line one-hundred-and-eighty degrees and running the two sides of the line parallel to each other. These two parallel lines are crimped together by both crimps to maintain the bight as a permanent element of the line at a distal end thereof. The two crimps are spaced apart by a sufficient distance to allow the two sides of the line to be separated to form a gap between the two sides of the line between the two crimps. Through this gap, a long (or proximal) end of the line may be passed through to form a loop. The ring may be placed on the bight with the line of the bight passing through the ring, so that the ring is constricted to the bight by the closest crimp. This ring is large enough for the long end of the line to pass through it as well, so that another loop may be formed. Thusly, in use, two loops or formed. One loop may be passed around an animal collar region, and another around an animal girth, to form a secure and safe harness around the animal. The remaining length of the line from the crimps to the proximal end is available to be used as a leash.

According to another embodiment, a method of harnessing an animal is also disclosed herein. The method of harnessing an animal includes providing the above-described animal harness, passing the proximal-end of the line though the rigid-loop, which could be a metal ring, to form a first-line-loop about a collar region of the animal, then passing the proximate-end of the line through the gap to form a second-line-loop about a girth of the animal, and pulling the loops snug to secure and retain the animal-harness around the animal.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a combination animal harness and leash with method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a animal harness and more particularly to a combination animal harness and leash with method as used to improve the harnessing of an animal.

Generally, the animal-harness is a unitary combination harness and leash affording greater convenience to animal owners. The device offers a combination harness and leash that is made from one piece of material. The animal-harness is constructed to enable a user to easily loosen and tighten the harness around the dog's torso as needed. Use of the device effectively eliminates the need to search for two separate items to take a dog for a walk. The animal-harness offers a safe and comfortable method for leading a dog in particular, although the harness may be useful for other animals as well.

The rope that the harness is constructed of may have a bight at one end and a gap between two crimps further down from the bight so that the rope may be looped through itself twice (once in the bight and then subsequently through the gap) to form a first loop around a neck of the dog, and then a second loop around a torso of the dog, such that one loop is formed around the collar region of the animal and the other loop is formed around the girth of the animal. The remaining end of the rope may be used as a leash. The rope may be polyester, and the bight may be formed using a metal crimp around the rope. The device may be available in various lengths for different breeds and sizes and may be available in various colors and designs. The exact specifications may vary.

Referring now more specifically to the drawings by numerals of reference, there is shown in FIGS. 1-4, various views of an animal-harness 100.

Figure 1:
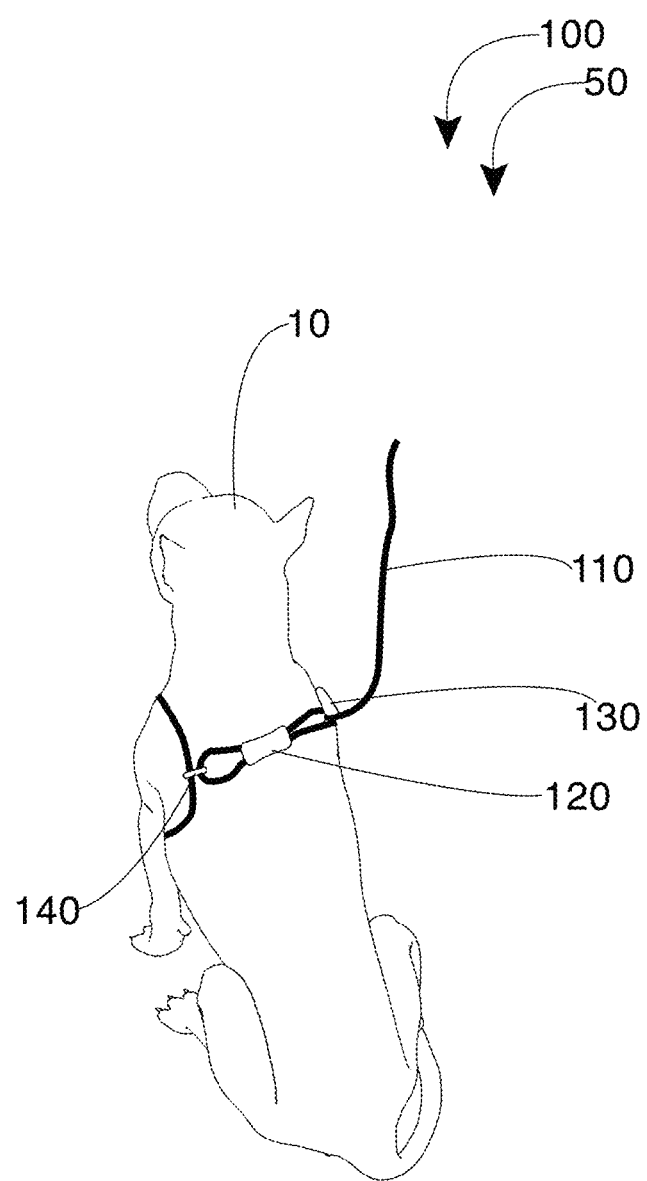
FIG. 1 is a perspective view of the animal-harness during an 'in-use' condition, according to an embodiment of the disclosure.

FIG. 1 shows an animal-harness during an 'in-use' condition 50, according to an embodiment of the present disclosure. Here, the animal-harness may be beneficial for use by a user 40 to harness an animal. As illustrated, animal-harness 100 may be able to circumscribe and restrain animal 10. Animal-harness 100 may include line 110, first-crimp 120, second-crimp 130, and rigid-loop 140. In various embodiments, line 110 may be constructed of cotton fabric, polyester, nylon rope, or cords made of other materials. In a preferred embodiment line 110 is a woven polyester rope. Also preferably, first-crimp 120 and second-crimp 130 may each be metal (preferably steel) crimps. However, in alternative embodiments, first-crimp 120 and second-crimp 130 may each be molded plastic crimps or other materials.

For the purposes of this specification, a bight is defined as a curve or loop of a flexible line which does not cross over itself, the curve or loop being distinct from the ends of the line. A line is defined as a flexible band. Examples of a line may be a cord or rope. The end of the bight is defined as the portion of bighted line from the first-crimp to the terminal turn of the bight. The separation is defined as the portion of bighted line from the first-crimp to the second crimp.

According to one embodiment, the animal-harness 100 may be arranged as a kit 105. In particular, the animal-harness 100 may further include a set of instructions 107. The instructions 107 may detail functional relationships in relation to the structure of the animal-harness 100 such that the animal-harness 100 can be used, maintained, or the like, in a preferred manner.

Upon reading this specification, it should be appreciated that, under appropriate circumstances, considering such issues as user preferences, design preference, structural requirements, marketing preferences, cost, available materials, technological advances, etc., other material arrangements such as, for example, additional features, buckles, snaps, leash elements, etc., may be sufficient.

Figure 2:
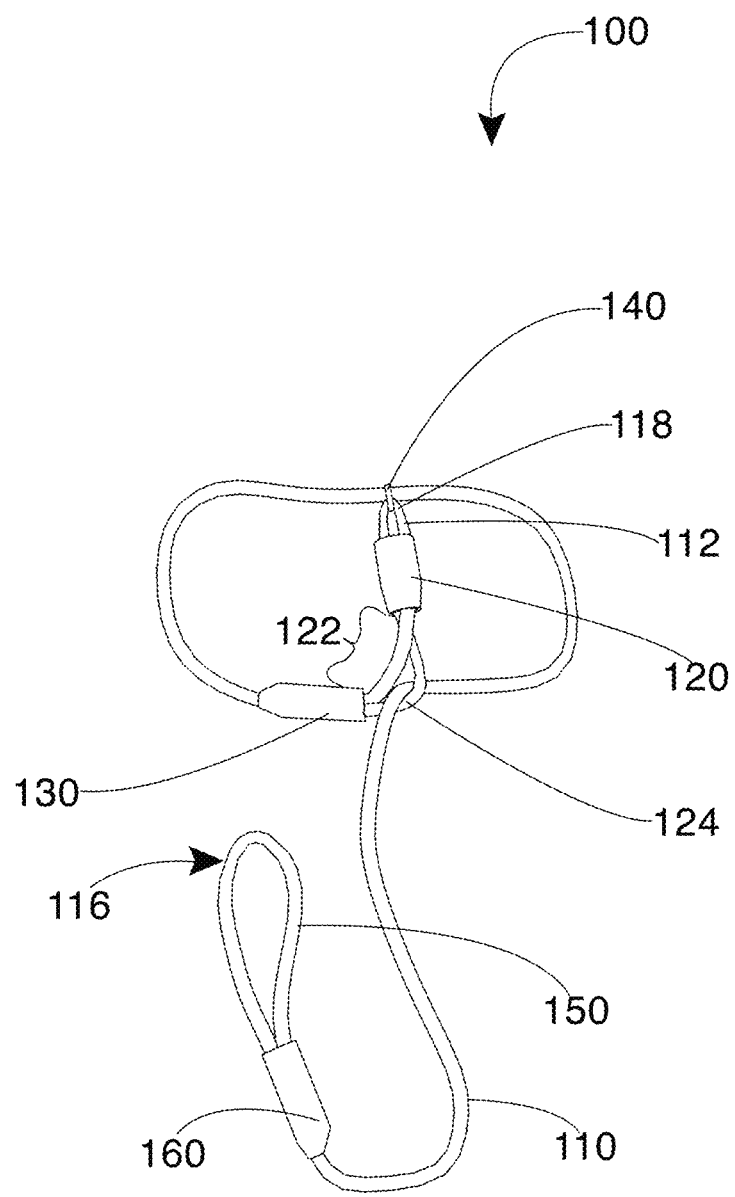
FIG. 2 is a perspective view of the animal-harness of FIG. 1, according to an embodiment of the present disclosure.

FIG. 2 shows the animal-harness 100 of FIG. 1, according to an embodiment of the present disclosure. As above, the animal-harness 100 may include line 110, first-crimp 120, second-crimp 130, and rigid-loop 140. Line 110 may be formed into bight 112 at distal-end 114 of line 110. First-crimp 120 may crimp line 110 to itself proximate to terminal end 118 of bight 112. Second-crimp 130 may likewise crimp line 110 to itself proximate to first-crimp 120, such that the two sides of bight 112 of line 110 continue in parallel to each other between first-crimp 120 and second-crimp 130. Separation 122 may be defined by the section of line 110 between first-crimp 120 and second-crimp 130. Separation 122 of first-crimp 120 and second-crimp 130 along line 110 defines gap 124 between two sides of bight 112 of line 110. Gap 124 may be large enough to permit proximate-end 116 of line 110 to pass through gap 124. Rigid-loop 140 may be disposed along bight 112. Line 110 may pass through rigid-loop 140, in such a location that rigid-loop 140 is restrained by first-crimp 120 to terminal end 118 of bight 112 of line 110. Rigid-loop 140 may be large enough to permit proximate-end 116 of line 110 to pass through rigid-loop 140. Preferably, line 110 also includes handle-bight 150 fastened by third-crimp 160, such that handle-bight 150 may be disposed at proximate-end 116 of line 110. Separation 122 may be between one and three inches in length. Also, rigid-loop 140 may be circular in shape. Rigid-loop 140 may be a unitary steel circular ring in an exemplary embodiment, and may be less than two inches in diameter. Alternatively, rigid-loop 140 may be a releasable fastener able to be released to remove and alternatively to install line 110 into rigid-loop 140. As an example of a releasable fastener, rigid-loop 140 may be a carabiner clip.

Figure 3:
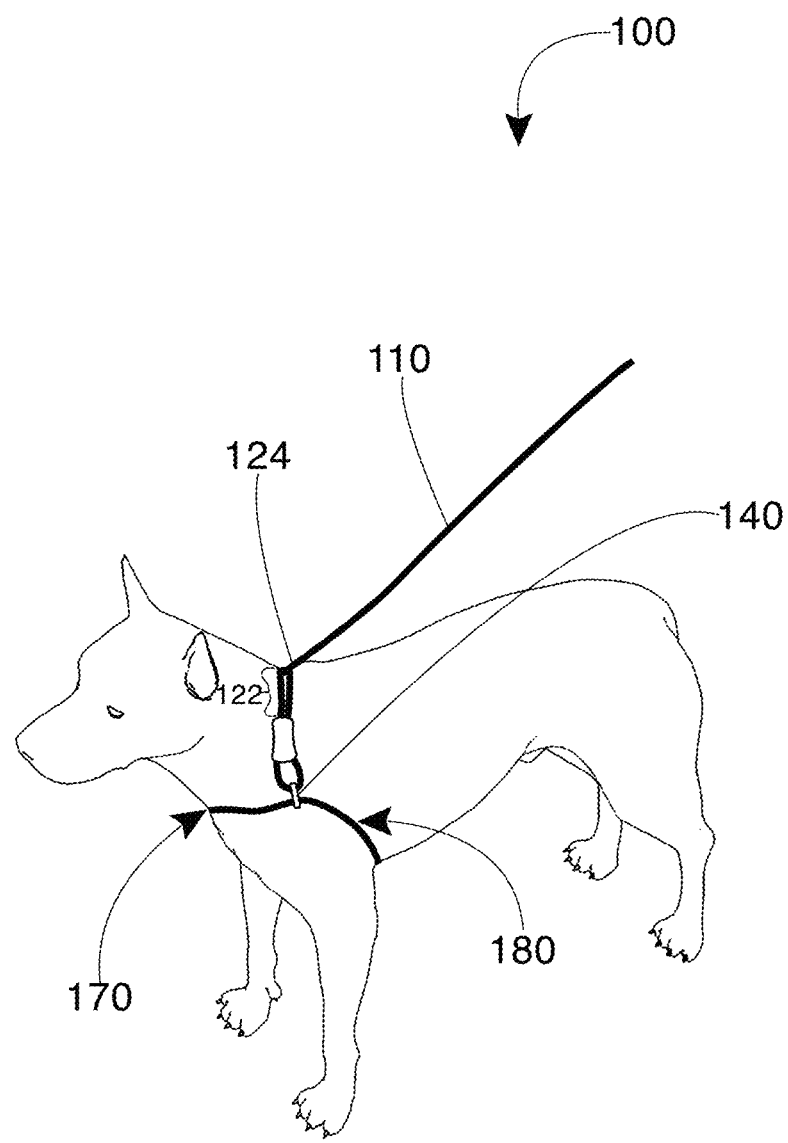
FIG. 3 is a perspective view of the animal-harness of FIG. 1, according to an embodiment of the present disclosure.

FIG. 3 is a top-left perspective view of the animal-harness 100 of FIG. 1, according to an embodiment of the present disclosure. In use, line 110 may pass through rigid-loop 140 to form first-line-loop 170 encircling a collar region of animal 10 (FIG. 1). First-line-loop 170 may incorporate the combined length of terminal end 118 (FIG. 2), separation 122, and line 110 as line 110 traverses from second-crimp 130 (FIG. 2) to the ring. Line 110 may subsequently pass through gap 124 to form second-line-loop 180 encircling a girth region of animal 10 (FIG. 1). Second-line-loop 180 may incorporate the length of line 110 as line 110 traverses from rigid-loop 140 to gap 124.

Figure 4:
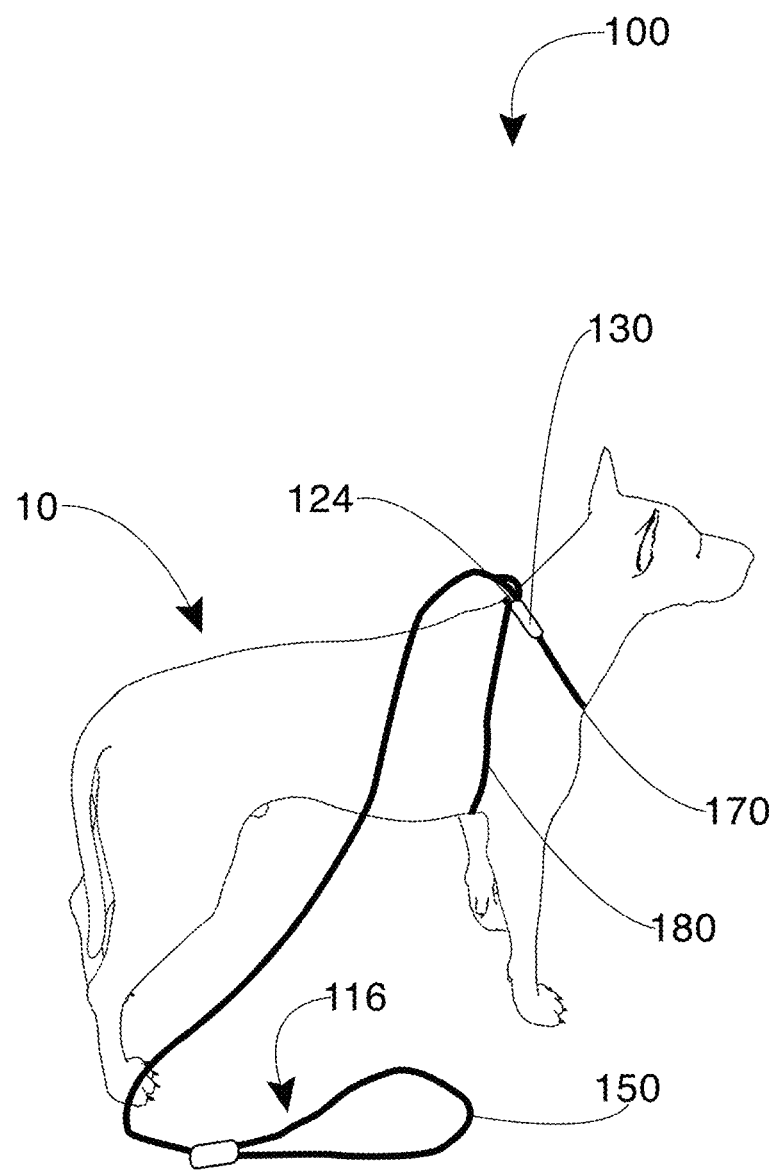
FIG. 4 is a perspective view of the animal-harness of FIG. 1, according to an embodiment of the present disclosure.

FIG. 4 is a right-side perspective view of the animal-harness 100 of FIG. 1, according to an embodiment of the present disclosure. At this angle, line 110 can be clearly seen encircling a girth of animal 10 and subsequently passing through gap 124 in order to complete second-line-loop 180. Further, line 110 can be seen encircling a collar region of animal 10 between second-crimp 130 and gap 124, thereby forming first-line-loop 170. As a user holds handle-bight 150, line 110 is unable to be withdrawn from gap 124, thereby retaining animal-harness 100 about animal 10.

Figure 5:
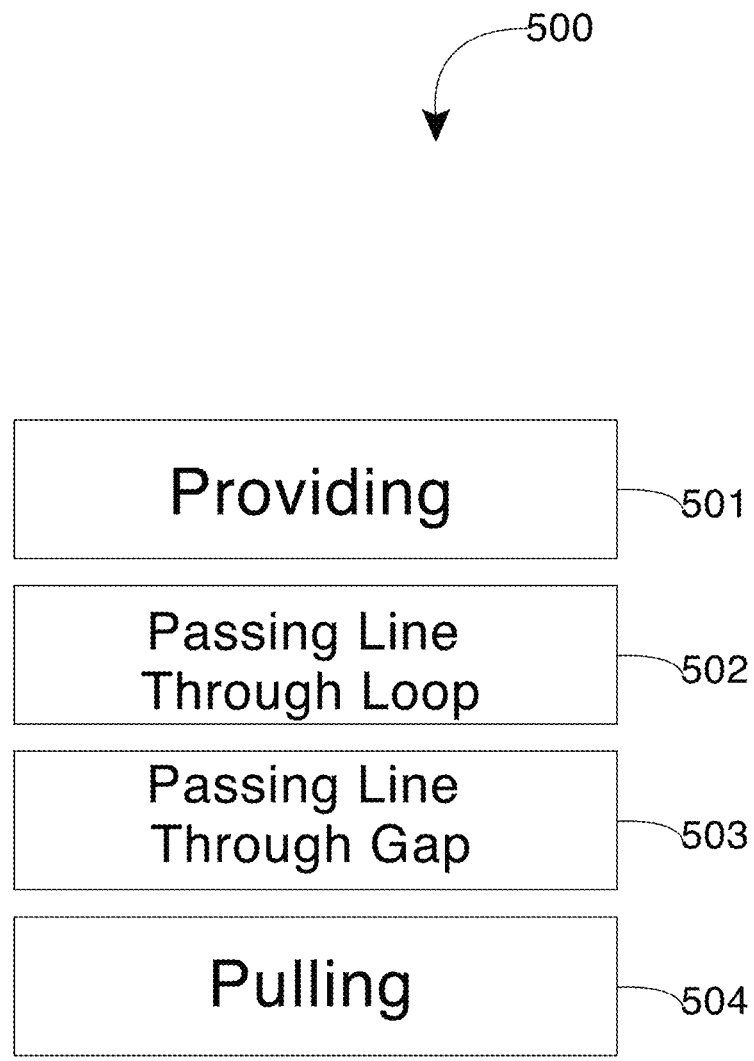
FIG. 5 is a flow diagram illustrating a method of use for harnessing an animal, according to an embodiment of the present disclosure.

FIG. 5 is a flow diagram illustrating a method for harnessing an animal, according to an embodiment of the present disclosure. In particular, the method for harnessing an animal 500 may include one or more components or features of the animal-harness 100 as described above. As illustrated, the method for harnessing an animal 500 may include the steps of: step one 501, providing an animal-harness able to circumscribe and restrain an animal, the animal-harness comprising a line, the line being formed into a bight at a distal-end of the line, a first-crimp crimping the line to itself proximal to a terminus of the bight, a second-crimp crimping the line to itself proximate to the first-crimp, such that the two sides of the bight of the line continue in parallel to each other between the first-crimp and the second-crimp, and the separation of the first-crimp and the second-crimp along the line defines a gap between two sides of the bight of the line, the gap being large enough to permit a proximate-end of the line to pass through the gap, and a rigid-loop which is passed through by the line, such that the rigid-loop is restrained by the first-crimp to the end of the bight of the line, the rigid-loop being large enough to permit the proximate-end of the line to pass through the rigid-loop; step two 502, passing the proximate-end of the line though the rigid-loop to form a first-line-loop about a collar of the animal; step three 503, passing the proximate-end of the line through the gap to form a second-line-loop about a girth of the animal; and step four 504, pulling the proximate-end of the line snug to retain the animal-harness about the animal.

It should be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for harnessing an animal, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An animal-harness able to circumscribe and restrain an animal, the animal-harness comprising:
    a line, the line being formed into a bight at a distal-end of the line;
    a first-crimp crimping the line to itself proximal to a terminus of the bight forming and end of the bight;
    a second-crimp crimping the line to itself proximate to the first-crimp, such that two sides of the bight of the line continue in parallel to each other between the first-crimp and the second-crimp, and the separation of the first-crimp and the second-crimp along the line defines a gap between two sides of the bight of the line, the gap being large enough to permit a proximate-end of the line to pass through the gap; and
    a rigid-loop which is passed through by the line, such that the rigid-loop is restrained by the first-crimp and the end of the bight, the rigid-loop being large enough to permit the proximate-end of the line to pass through the rigid-loop;
    wherein the line passes through the gap to form a second-line-loop, the second-line-loop incorporating the length of the line traversing from the rigid-loop to the gap.

2. The animal-harness of claim 1, wherein the separation is between one and three inches in length.

3. The animal-harness of claim 1, wherein the rigid-loop is a unitary steel circular ring.

4. The animal-harness of claim 1, wherein the rigid-loop is circular in shape.

5. A unitary combination leash and harness able to circumscribe and restrain an animal, the unitary combination leash and harness comprising:
    a line, the line being formed into a bight at a distal-end of the line;
    a first-crimp crimping the line to itself proximal to a terminus of the bight forming an end of the bight;
    a second-crimp crimping the line to itself proximate to the first-crimp, such that the two sides of the bight of the line continue in parallel to each other between the first-crimp and the second-crimp, and the separation of the first-crimp and the second-crimp along the line defines a gap between two sides of the bight of the line, the gap being large enough to permit a proximate-end of the line to pass through the gap; and
    a rigid-loop which is passed through by the line, such that the rigid-loop is restrained by the first-crimp and the end of the bight, the rigid-loop being large enough to permit the proximate-end of the line to pass through the rigid-loop;
    wherein the line further comprises a handle-bight fastened by a third-crimp, the handle-bight being disposed at the proximate end of the line;
    wherein the line passes through the rigid-loop to form a first-line-loop, the first-line-loop incorporating the length of the end of the bight, the separation, and the line traversing from the second-crimp to the rigid-loop;
    wherein the line passes through the gap to form a second-line-loop, the second-line-loop incorporating the length of the line traversing from the rigid-loop to the gap;
    wherein the rigid-loop is a closed unitary component; and
    wherein the rigid-loop is circular in shape.

6. A method of harnessing an animal, the method comprising the steps of:
    providing an animal-harness able to circumscribe and restrain an animal, the animal-harness comprising a line, the line being formed into a bight at a distal-end of the line, a first-crimp crimping the line to itself proximal to a terminus of the bight forming an end of the bight, a second-crimp crimping the line to itself proximate to the first-crimp, such that the two sides of the bight of the line continue in parallel to each other between the first-crimp and the second-crimp, and the separation of the first-crimp and the second-crimp along the line defines a gap between two sides of the bight of the line, the gap being large enough to permit a proximate-end of the line to pass through the gap, and a rigid-loop which is passed through by the line, such that the rigid-loop is restrained by the first-crimp and the end of the bight, the rigid-loop being large enough to permit the proximate-end of the line to pass through the rigid-loop;
    passing the proximate-end of the line though the rigid-loop to form a first-line-loop about a collar of the animal;
    passing the proximate-end of the line through the gap to form a second-line-loop about a girth of the animal; and
    pulling the proximate-end of the line snug to retain the animal-harness about the animal.

* * * * *